United States Patent Office 3,813,375
Patented May 28, 1974

3,813,375
MAKING POWDERS OF ETHYLENE POLYMERS
Hans Joachim Klocke, Frankenthal, Dieter Stockburger, Gruenstadt, Volker Gierth, Ludwigshafen, and Gerhard Zeitler, Hessheim, Germany, assignors to Badische Anilin & Soda-Fabrik Aktiengesellschaft, Germany
No Drawing. Filed Mar. 1, 1972, Ser. No. 230,958
Int. Cl. C08f 3/04, 1/92
U.S. Cl. 260—94.9 GD          6 Claims

ABSTRACT OF THE DISCLOSURE

Method of making powders from ethylene polymers by dissolving the ethylene polymers at a temperature above 60° C. in a fluorinated chlorohydrocarbon having from 1 to 4 carbon atoms and 0 to 2 hydrogen atoms, cooling the solution to a temperature below 60° C. or evaporating the solvent, and collecting the pulverized ethylene polymers.

---

The present invention relates to a process for the production of ethylene polymer powders, in which the ethylene polymer is dissolved in a fluorochlorohydrocarbon and a powdered ethylene polymer is obtained by cooling the solution or evaporating the solvent.

It is known that powdered polyethylene can be prepared from granules by grinding or by dissolving and reprecipitating them. Ethylene polymer powder is also obtained by spraying a molten polymer at elevated temperature and superatmospheric pressure. Powder whose particle size is from 200 to 600 microns is obtained by grinding or spraying. If it is desired however to prepare a powder whose particle size is less than 100 microns, the cost is very high. It is therefore mainly the method of dissolving the polymer in a solvent and reprecipitating it therefrom which is used for the preparation of polyethylene powder having a particle size below 100 microns. For example polyethylene may be dissolved in hot xylene or toluene and precipitated by adding an alcohol (cf. B. Vollmert, "Grundriss de Makromolekularen Chemie," Springer Verlag, Berlin-Göttingen-Heidelberg, 1962, page 179). The powder is filtered off and dried. The main disadvantage of this method is that the solvent has to be separated from the alcohol by fractional distillation.

It is an object of the present invention to provide a more simple method for the production of ethylene polymer powder in which a powder is obtained whose particle size is less than 100 microns.

We have found that this object is achieved by dissolving an ethylene polymer at a temperature above 60° C. in a fluorochlorohydrocarbon of one to four carbon atoms which contains not more than two hydrogen atoms or none at all, cooling the solution to a temperature below 60° C. or evaporating the solvent, and isolating the ethylene polymer powder.

An advantageous embodiment of the process consists in dissolving in a fluorochlorohydrocarbon a molten ethylene polymer coming from the high pressure reactor and which has not come into contact with the air, cooling the solution to a temperature below 60° C. or evaporating the solvent, and isolating the ethylene polymer powder.

Ethylene polymers include both homopolymers and copolymers of ethylene. The process is particularly suitable for polymers prepared by the high pressure polymerization method, for example polyethylene having a density of from 0.916 to 0.935 g./ccm. and copolymers of ethylene which contain polymerized units of 0.1 to 25% by weight of one or more comonomers. Suitable comonomers are acrylic esters, methacrylic esters, fumaric esters and maleic esters derived from alcohols of one to eight carbon atoms, and vinyl esters of carboxylic acids of two to six carbon atoms. A powder having a particle size less than 100 microns can also be prepared by the process of the invention from polyethylene having a density of 0.93 to 0.965 g./ccm. which has been prepared by the low pressure method. The melt index (determined according to ASTM-D-1238T) of the suitable polymers is as a rule from 0.01 to 100 g./10 min. at an applied weight of 2.16 kg. at 190° C.

Suitable fluorochlorohydrocarbons for the process of the invention have one to four carbon atoms and contain no hydrogen atoms, one hydrogen atom or two hydrogen atoms. The following are particularly suitable: trichlorofluoromethane, dichlorodifluoromethane, 1,2,2-trifluorotrichloroethane, 1,1,2,2 - tetrafluorodichloroethane, trifluorochloromethane, monofluorodichloromethane and compounds of the formula $CCl_2F$—$CCl_2F$. It is also possible to use mixtures of fluorochlorohydrocarbons. The boiling point of the preferred fluorochlorohydrocarbons is from $-30°$ to $+100°$ C.

The ethylene polymer is dissolved in a pressure container or at atmospheric pressure depending on the boiling point of the fluorochlorohydrocarbon used. This may be done batchwise, for example in a stirred vessel, or continuously through a mixing zone in a tube. The ratio by weight of ethylene polymer to solvent is as a rule from 1:4 to 1:20. It depends on the molecular weight of the polymer. For example a ratio by weight of ethylene polymer to fluorochlorohydrocarbon of from 1:8 to 1:10 is used at molecular weights of from 100,000 to 200,000. In order to dissolve the polymer in the said fluorochlorohydrocarbons it is necessary to heat the mixture to a temperature about 60° C. As a rule the solution is not heated to a temperature above 150° C. When the solution of the ethylene polymer in a fluorochlorohydrocarbon is cooled to a temperature below 60° C., the ethylene polymer is precipitated in a finely divided form. The solutions may be cooled in batches in the vessels in which they have been prepared or continuously in a tube which is cooled externally and which is connected downstream of the mixing zone for the preparation of the solution. The deposited solid may be separated from the solvent for example through a centrifugal filter and dried by a conventional method. Ethylene polymer powder is obtained in this way which has limiting sizes of the particles of from 5 to 100 microns. The maximum particle distribution is as a rule between 40 and 60 microns.

Powder having a particle size of less than 100 microns is also obtained when the solvent in which the ethylene polymer has been dissolved is evaporated. Powder made from the said ethylene polymers is used for example for powder coating electrical conductors.

The process of the invention is illustrated in greater detail in the following Examples. The parts given in the Examples are parts by weight.

EXAMPLE 1

100 parts of polyethylene which is in the form of granules and which has a molecular weight of 120,000 and a density of 0.918 g./ccm. is dissolved in 800 parts of trichlorofluoromethane at 100° C. in a pressure vessel. After all the granules have dissolved, the mixture is not stirred any more. The vessel is externally cooled to 20° C. Finely particled polyethylene is thus precipitated. It has a particle distribution from 10 to 90 microns; the maximum in the particle size distribution is 50 microns.

EXAMPLE 2

A solution of high pressure polyethylene in trichlorofluoromethane is prepared at 100° C. as described in Example 1. The solution is allowed to evaporate. A polyethylene powder is obtained which also has a particle size distribution from 10 to 90 microns. It is surprising that no agglomerates form.

COMPARATIVE EXAMPLE 100 parts of polyethylene having a molecular weight of 120,000 is dissolved in toluene. Under the same conditions as in Example 1 a cake which cannot be processed into powder is obtained after cooling.

EXAMPLE 3

100 parts of low pressure polyethylene having a molecular weight of 80,000 is dissolved in 1000 parts of 1,2,2-trifluorotrichloroethane at 130° C. at superatmospheric pressure. After cooling a polyethylene powder is obtained having a particle size distribution of 5 to 80 microns. The maximum in the particle size distribution is 40 microns.

EXAMPLE 4

100 parts of an ethylene copolymer containing 10% by weight of n-butyl acrylate which has a melt index (2.16/190° C.) of 1.5 is dissolved in 800 parts of trichlorofluoromethane at 100° C. under pressure. After cooling a finely particled powder is obtained having a particle size distribution of 10 to 100 microns. The maximum in the particle size distribution is 60 microns.

We claim:

1. A method of producing powders from ethylene polymers which comprises dissolving at a temperature above 60° C. a polymer selected from the group consisting of polyethylene, copolymers of ethylene and acrylic acid ester, copolymers of ethylene and methacrylic acid ester, copolymers of ethylene and fumaric acid ester, and copolymers of ethylene and maleic acid ester, said esters being derived from an alcohol having from 1 to 8 carbon atoms, copolymers of ethylene with vinyl esters of carboxylic acids having 2 to 6 carbon atoms, said ethylene copolymers containing 0.1 to 25% by weight of one or more comonomer units and having a melt index at 2.16 kg. and 190° C. according to ASTM D-1238 of from 0.01 to 100 g./10 minutes, in a fluorinated chlorohydrocarbon having from 1 to 4 carbon atoms and 0 to 2 hydrogen atoms, cooling the solution at a temperature below 60° C. and collecting the pulverized ethylene polymer.

2. A method of producing powders from ethylene polymers which comprises dissolving at a temperature above 60° C. a polymer selected from the group consisting of polyethylene, copolymers of ethylene and acrylic acid ester, copolymers of ethylene and methacrylic acid ester, copolymers of ethylene and fumaric acid ester, and copolymers of ethylene and maleic acid ester, said esters being derived from an alcohol having from 1 to 8 carbon atoms, copolymers of ethylene with vinyl esters from carboxylic acids having 2 to 6 carbon atoms, said ethylene copolymers containing 0.1 to 25% by weight of one or more comonomer units and having a melt index at 2.16 kg. and 190° C. according to ASTM D-1238 of from 0.01 to 100 g./10 minutes, in a fluorinated chlorohydrocarbon having from 1 to 4 carbon atoms and 0 to 2 hydrogen atoms, evaporating the solvent and collecting the pulverized ethylene polymer.

3. A method as claimed in claim 1, wherein a melt is pulverized which has been obtained in the high-pressure polymerization of ethylene and has not been in contact with air.

4. A method as claimed in claim 1, wherein the ratio by weight of the ethylene polymer to the fluorinated chlorohydrocarbon is from 1:4 to 1:20.

5. A method as claimed in claim 2, wherein the ratio by weight of the ethylene polymer to the fluorinated chlorohydrocarbon is from 1:4 to 1:20.

6. A method as claimed in claim 1, wherein the solvent is a compound selected from the group consisting of trichlorofluoromethane, dichlorodifluoromethane, 1,2,2-trifluorotrichloroethane, 1,1,2,2-tetrafluorodichloroethane, trifluorochloromethane, monofluorodichloromethane $$CCl_2F\text{---}CCl_2F$$

References Cited

UNITED STATES PATENTS

| | | | |
|---|---|---|---|
| 3,657,165 | 4/1972 | Kawai et al. | 260—97.3 |
| 3,067,147 | 12/1962 | Rubens et al. | 260—87.3 |
| 3,422,049 | 1/1969 | McClain | 260—86.7 |
| 3,372,154 | 3/1968 | Turner et al. | 260—94.9 F |
| 3,372,153 | 3/1968 | Turner et al. | 260—94.9 F |
| 3,322,720 | 5/1967 | Dempsey et al. | 260—94.9 F |
| 3,259,609 | 7/1966 | Satake et al. | 260—94.9 F |
| 3,244,687 | 4/1966 | Spindler | 260—94.9 GD |
| 2,945,020 | 7/1960 | Hall | 260—94.9 GD |

FOREIGN PATENTS

| | | | |
|---|---|---|---|
| 849,112 | 9/1960 | Great Britain | 260—94.9 B |

JOSEPH L. SCHOFER, Primary Examiner

A. HOLLER, Assistant Examiner

U.S. Cl. X.R.

260—78.5 T, 86.7, 87.3, 94.9 F

UNITED STATES PATENT AND TRADEMARK OFFICE
CERTIFICATE OF CORRECTION

PATENT NO. : 3,813,375

DATED : May 28, 1974

INVENTOR(S) : Hans Joachim Klocke, D. Stockburger, V. Gierth and G. Zeitler

It is certified that error appears in the above–identified patent and that said Letters Patent are hereby corrected as shown below:

In the heading, insert--Claims priority, Application German, March 4, 1971, P 21 10 263.6--;

Column 4, line 30 under References cited, the last set of numbers delete "97.3" and insert--87.3--.

Signed and Sealed this seventh Day of October 1975

[SEAL]

Attest:

RUTH C. MASON
*Attesting Officer*

C. MARSHALL DANN
*Commissioner of Patents and Trademarks*